United States Patent [19]

Sesser et al.

[11] 4,190,391
[45] Feb. 26, 1980

[54] BALE RETAINER MEANS ON A BALE WAGON

[75] Inventors: George L. Sesser, Clovis; Anthony E. Furtado, Geyserville, both of Calif.

[73] Assignee: Sperry Rand Corporation, New Holland, Pa.

[21] Appl. No.: 691,677

[22] Filed: Jun. 1, 1976

[51] Int. Cl.² .............................................. B65G 21/20
[52] U.S. Cl. ........................................ 414/39; 414/68; 414/501
[58] Field of Search ................... 214/6 B, 6 C, 78, 80, 214/518; 414/39, 68, 501

[56] References Cited

U.S. PATENT DOCUMENTS

| | | | |
|---|---|---|---|
| 3,395,814 | 8/1968 | Grey | 214/6 B |
| 3,549,023 | 12/1970 | Backman | 214/6 B |
| 3,687,302 | 8/1972 | Castro | 214/6 B |
| 3,826,389 | 7/1974 | Godfrey et al. | 214/6 C |

Primary Examiner—Joseph F. Peters, Jr.
Assistant Examiner—Ross Weaver
Attorney, Agent, or Firm—John B. Mitchell; Frank A. Seemar; Ralph D'Alessandro

[57] ABSTRACT

A bale retainer finger structure located on a bale wagon along a first table thereof has a pointed tip which will embed into a bale and restrain it from being dislocated toward a bale-receiving end of the first table during the transfer of the bale to a second table on the bale wagon. The finger structure also is mounted for pivotal movement relative to the transfer path of the bale such that its tip completely withdraws from the bale before the bale is completely delivered to the second table but only after the bale has made firm contact with the surface of the second table.

6 Claims, 8 Drawing Figures

BALE RETAINER MEANS ON A BALE WAGON

BACKGROUND OF THE INVENTION

1. Field of the Invention

The present invention relates generally to the art of forming a stack of crop material bales and, more particularly, is concerned with bale retainer means on a bale wagon for facilitating accurate positioning of bales on the bale wagon and thereby enhanced formation of the stack of bales thereon.

2. Description of the Prior Art

It is accepted present day practice to form bales of crop material such as hay or the like into stacks through the employment of an automatic bale wagon.

One type of bale wagon which has achieved widespread commercial acceptance is the automatic bale wagon which employs the three table concept, as originally illustrated and described in U.S. Pat. No. 2,848,127 to G. E. Grey.

The Grey bale wagon includes a transversely-mounted first table normally disposed in a generally horizontal position in which it successively receives bales from a bale loader or pickup positioned on the wagon adjacent one end of the first table and accumulates a predetermined number of bales at a time, for example, a single bale or two bales being arranged end-to-end in a row, a second table normally disposed in a generally horizontal position rearwardly of and above the first table in which it successively receives the bale or bales from the first table when the latter is pivoted upwardly and rearwardly approximately 90° and accumulates the bales until a full tier of bales has been formed thereon, and a third table or load bed normally disposed in a generally horizontal position rearwardly of and above the second table in which it successively receives the tiers of bales from the second table when the latter is pivoted upwardly and rearwardly approximately 90° and accumulates the tiers until a full stack of bales has been formed thereon. Once the stack has been accumulated on the load bed, it may be unloaded by pivoting the load bed upwardly and rearwardly approximately 90° and depositing the stack on the ground or the like with the bales as previously accumulated into the tiers thereof on the second table of the wagon now forming the horizontal layers of bales in the stack now standing on the ground.

To a significant degree, the efficient operation of the Grey bale wagon and specifically the quality of the stack formed thereby in terms of its ability to stand over long periods of time and to be retrieved depends upon the first table of the wagon being able to accurately transfer bales to desired predetermined locations on the front surface area of the second table in the formation of the tiers of bales on the second table which tiers ultimately will become the horizontal layers of bales in the stack standing on the ground. To assist the first table in accurately positioning bales on the second table, the Grey bale wagon includes a trip arm disposed along the first table at a remote position from the bale loader end of the first table. When it is desired to transfer two bales arranged end-to-end on the first table, the trip arm is commonly located at the end of the first table opposite from the bale loader. The purpose of the trip arm is to actuate the upward and rearward pivotal motion of the first table when the leading end of the first of the two bales being advanced along the first table engages the trip arm. The position of the trip arm is such that the two bales will have reached respective positions along the first table that are aligned with the desired predetermined locations for the bales on the second table when the leading end of the first bale engages the trip arm.

A cross conveyor on the Grey bale wagon extends along and slightly above the level of the first table when the latter is in its horizontal position. The cross conveyor engages a bale as the latter leaves the bale loader and will advance it toward the opposite end of the first table until the trailing end of the bale has about reached a center position along the table. Consequently, the cross conveyor advances the first bale along the first table and then advances the second bale therealong such that the latter pushes the first bale ahead of it and into engagement with the trip arm with sufficient force to cause the trip arm to pivot outwardly against its bias and thereby actuate the upward pivotal movement of the first table.

Although normally satisfactory, under certain crop conditions the above described arrangement and manner for tripping the first table causes problems of inaccurate bale placement on the second table. For instance, if the bales are rather loosely formed or spongy, the second or trailing bale when forced by the cross conveyor into the first or leading bale may become compressed or buckle upwardly slightly on the first table immediately before the latter is tripped. Then, once the first table is tripped and moves upwardly, it passes the upper level of the cross conveyor before it passes the upper end of the trip arm and, because of this, frequently the second bale springs back toward the bale loader end of the first table, creating a large gap between the two bales on the first table. The gap is carried over to their placement on the second table which results in dislocation of the second bale from its desired predetermined location on the second table. The inability to accurately place bales on the second table under such conditions fosters instability in the stack being formed.

Also, under certain field terrain conditions, the above described arrangement and manner for tripping the first table causes similar problems. For instance, in hillside terrain when the bale loader end of the first table is lower than the trip arm end, the bales will oftentimes slide along the table toward the loader after the first table has tripped and moved above the upper level of the cross conveyor. This results in dislocation of one or both of the bales along the first table which is carried over to their placement on the second table.

SUMMARY OF THE INVENTION

The present invention substantially overcomes the above-described problems of inaccurate bale placement on the second table of the bale wagon by providing an improvement in the form of bale retainer means for restraining bale movement along the first table toward the bale loader or bale-receiving end thereof as the bale or bales are being transferred to the second table.

Particularly, the bale retainer means is mounted on the bale wagon so as to be able to travel or move with the bale or bales which are moving with the first table, while at the same time restrain the bales from being dislocated toward the bale-receiving end of the first table.

Further, the bale retainer means is arranged relative to the moving bales such that the latter will move away from the retainer means as the bales are delivered to the second table, whereby the retainer withdraws completely from the bale before the bale is completely delivered to the second table but only after the bale has made good contact with the surface of the second table. Consequently, the retainer means does not have to be forced out of the bale.

Other advantages and attainments of the present invention will become apparent to those skilled in the art upon a reading of the following detailed description when taken in conjunction with the drawings in which there is shown and described an illustrative embodiment of the invention.

BRIEF DESCRIPTION OF THE DRAWINGS

In the course of the following detailed description reference will be frequently made to the attached drawings in which.

DETAILED DESCRIPTION OF THE INVENTION

In the following description, right hand and left hand references are determined by standing at the rear of the machine and facing in the direction of forward travel. Also, in the following description, it is to be understood that such terms as "forward," "upwardly," etc., are words of convenience and are not to be construed as limiting terms.

IN GENERAL

Figure 1:
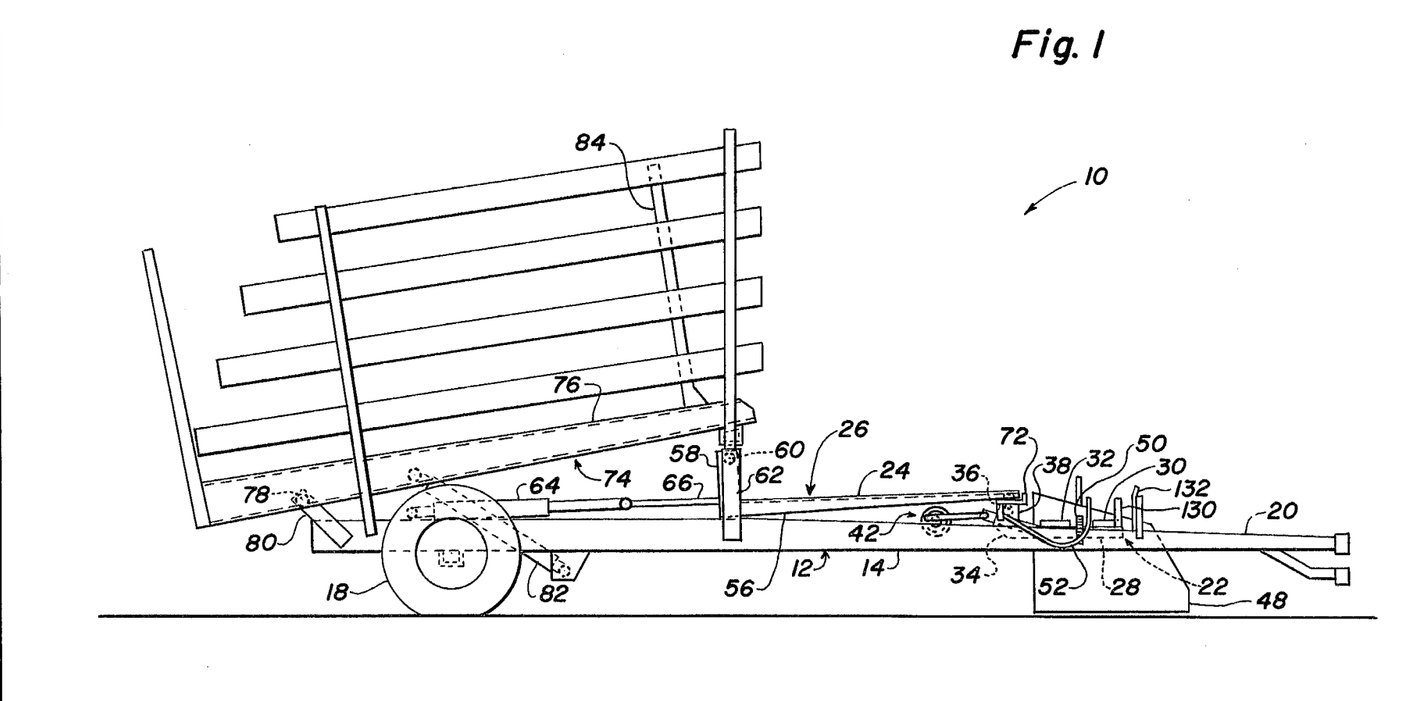
FIG. 1 is a side elevational view of a bale wagon incorporating the bale retainer means which comprises the improvement provided by the present invention.

Referring now to the drawings, and particularly to FIG. 1, there is shown a bale wagon, being indicated generally by the numeral 10, for forming a stack of bales and incorporating the preferred embodiment of the improvement provided by the present invention.

The bale wagon 10 is provided with a mobile chassis, indicated generally as 12, formed of right and left longitudinally extending channels 14,16 (see FIG. 2), suitably interconnected by spaced transverse channels (not shown), and rear wheels 18 (only the right rear wheel being shown) for movably supporting the interconnected longitudinal channels 14,16. The forward ends of the channels 14,16 converge in a clevis assembly 20 which adapts the wagon 10 to be secured to a tractor, or other towing vehicle, located at the front of the wagon 10. Although the wagon illustrated is a pull-type wagon, it could readily take the form of a self-propelled type.

Mounted near the forward end of the mobile chassis 12, immediately rearwardly of the clevis assembly 20, and extending transversely thereto, is means for receiving bales, generally indicated by the numeral 22 and hereinafter referred to as a first, bale-receiving table of the wagon 10. The first table 22 is positioned adjacently along and generally below a bale-supporting bed or area, generally designated 24, defined by bale-accumulating means hereinafter referred to as a second, tier-forming table of the wagon 10, generally indicated by the numeral 26.

The first table 22 is formed by an L-shaped structure having a forwardly-extending horizontal portion 28 on which is mounted two transversely extending spaced beams 30,32. The L-shaped structure also has a rear upwardly extending leg portion 34 which is pivotally secured at 36 between spaced-apart upstanding right and left front brackets 38,40 (FIG. 2) respectively mounted on the longitudinal channels 14,16. A mechanical drive assembly, generally indicated at 42, is disposed below the second table 26 and includes a forwardly-extending driving rod 44 generally located between the channels 14,16. The assembly 42 is generally similar to the one illustrated and described in U.S. Pat. No. 3,862,692 and need not be illustrated and described in detail herein for a thorough and clear understanding of the present invention. The driving rod 44 of the drive assembly 42 at its forward end is pivotally secured to the free end of an arm 46 which is fixedly secured to, and extends rearwardly and upwardly from, the L-shaped structure of the first table 22. As the driving rod 44 moves forward, the first table 22 will swing or pivot approximately 90° upwardly about its pivot point 36 transferring any bales B which have been received on the first table 22 onto the forward end of the area 24 of the second table 26.

It will be understood by those skilled in the art, that bales are first introduced to the first table 22 by means of a bale loader or pickup, generally indicated at 48, which is mounted to the chassis 12 at the left end of the first table 22 and operative to lift bales from the ground and direct them through a generally 90° arcuate lateral path to the left receiving end of the first table 22. The loader 48, well known in the art, is generally similar to the one illustrated and described in U.S. Pat. No. 2,848,127 and need not be illustrated and described in detail herein for a thorough and clear understanding of the present invention.

Also, it will be understood by those skilled in the art, that a cross conveyor 50 is operatively mounted to the chassis 12 and longitudinally extends between, along, and slightly above the level of, the front and rear beams 30,32 of the first table 22 (when the table is in its lower horizontal position) from approximately the left receiving end to near the middle of the beams 30,32 for advancing the bales laterally from the loader 48 toward the right end of the first table 22. The cross conveyor 50, also well known in the art, is generally similar to the one illustrated and described in U.S. Pat. No. 2,848,127 and need not be illustrated and described in detail herein for a thorough and clear understanding of the present invention.

Figure 3:
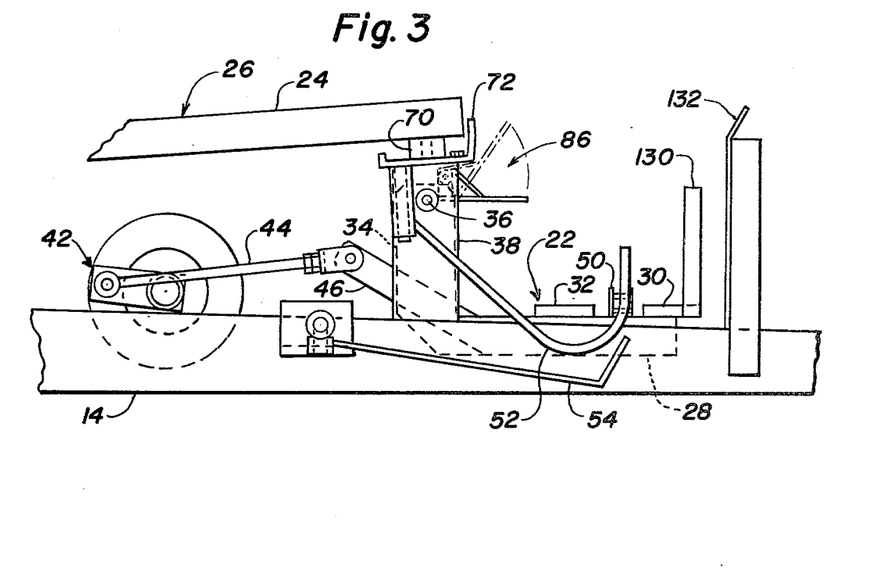
FIG. 3 is a side elevational view of the forward end of the bale wagon of FIG. 2, showing that the bale retainer means is also pivotally mounted for generally vertical movement between its normal, lower solid line position of FIG. 2 and an upper bale-releasing broken line position to which it is yieldably moved as the bale on the first table is transferred to the second table.

The first table 22 is capable of receiving a predetermined number of bales, preferably two bales, successively at a given time from the bale loader 48. After receiving the two bales in end-to-end arrangement from the loader 48, an outer bale trip arm or lever 52 located at the right end of the first table 22 is engaged and pivoted laterally outward by the leading end of the first of the two bales being advanced toward the right end of the first table 22 by the cross conveyor 50. Such pivoting of trip arm 52 causes actuation of the mechanical drive assembly 42 and thereby forward and rearward reciprocatory movement of its driving rod 44 which, in turn, causes pivotal movement of the first table 22 from a lower, bale-receiving position (FIG. 3) to an upper, bale-discharge position adjacent the second table 26 and back to the lower position. The trip mechanism of which the trip arm 52 is a part and the interconnection of the trip mechanism with the drive assembly 42 is generally similar to that illustrated and described in U.S. Pat. No. 3,862,692 and need not be illustrated and described in detail herein for a thorough and clear understanding of the present invention. Thus, the first table 22 will successively receive and transfer two bales arranged end-to-end to the second table 26 until a full tier has been formed thereon. Such type of tier is commonly referred to as a standard tier pattern of bales.

However, it is often desirable to be able to form bales into other types of tier patterns, such as tie tier patterns, in order to enhance the stability of the stack formed on the wagon 10 when the stack is deposited on the ground. The formation of such types of tier patterns requires that periodically a single bale be transferred from the first table 22 to the second table 26. For this purpose, another trip arm, generally indicated at 54, which has the same function as the arm 52, may be provided on the chassis 12 as a part of the trip mechanism, and when its use is desired, moved to an operative position in which it extends above the level of the first table beams 30,32 at a location somewhat laterally displaced to the right of center along the first table 22. The inner trip arm 54 is engaged and pivoted laterally toward the right by the leading end of the single bale when the same is received from the loader 48 and advanced to an approximate centered position along the first table 22 by the cross conveyor 50. This inner trip arm 54 and a tie spike mechanism (not shown), both of which are utilized to form bales into tie tiers, are illustrated and described in U.S. Pat. No 3,395,814 and well known to those skilled in the art. Accordingly, the details of the same need not be illustrated and described herein for a thorough and clear understanding of the present invention.

The second, tier-forming table 26 is formed by an L-shaped structure having a forwardly extending leg portion 56 across which is defined the bed or area 24 which provides a surface upon which bales are accumulated and formed into a tier (whether such be a standard or tie tier) and an upwardly extending rear leg portion 58 which is pivotally secured at 60 between spaced apart upstanding brackets 62, only the right one being shown in FIG. 1, mounted on the longitudinal channels 14,16. A hydraulic cylinder 64 is pivotally secured at its anchor end to the chassis 12 and its rod end is pivotally secured to the free end of an arm portion 66 which is fixedly secured to, and extends rearwardly from, the L-shaped structure of the second table 26.

When the second table 26 is in its normal horizontal tier-forming position, as shown in FIG. 1, it rests at its forward end on a pair of spaced apart rubber bumpers 68,70 mounted on a transverse support member 72 fixed across the upstanding right and left front brackets 38,40. The front edge of member 72 serves as a rear bale guide for the bales being received and advanced along the first table 22. When the requisite number of bales have been accumulated and formed on the second table 26 in a suitable manner into the standard tier pattern, or one of several tie tier patterns, the hydraulic cylinder 64 is actuated so as to extend and cause the table 26 to swing or pivot upwardly generally 90° about its pivot point 60 to a generally vertical position adjacent the front end of the rearwardly disposed tier-accumulating means hereinafter referred to as the load bed, or third load table, being generally indicated by the numeral 74. In this manner, the tier of bales formed on the second table 26 is transferred to the load bed 74.

It will be understood by those skilled in the art, that trip means (not shown) is located near the rear end of the second table 26 which is engaged by the rearmost bales in the tier when the tier is completely formed and causes actuation of the hydraulic cylinder 64 and thereby pivotal movement of the second table 26. The structure and function of the second table trip means, well known in the art, is generally similar to that illustrated and described in U.S. Pat. No. 3,502,230 and need not be illustrated and described herein for a thorough and clear understanding of the present invention.

The load-carrying bed 74 includes a platform assembly 76 which is pivotally mounted at 78 between spaced apart upstanding rear brackets 80, only the right one being shown in FIG. 1, mounted on the longitudinal channels 14,16. A pair of spaced apart hydraulic cylinders 82, only the right one being shown, are pivotally secured at their anchor ends to the chassis 12 and at their rod ends to the platform assembly 76. When the load bed 74 is in its normal, generally horizontal tier-receiving position, as shown in FIG. 1, it rests at its forward end on upstanding brackets 62. A stack of bales is progressively formed on the load bed 74 upon successive delivery thereto of tiers of bales by pivotal movement of the second table 26 from its normal horizontal tier-forming position of FIG. 1 to its generally upright position adjacent the forward end of the load bed 74.

As the first bale tier is delivered or deposited onto the load bed 74, a fore-and-aft movable rolling rack, being generally indicated by the numeral 84, is contacted by the tier and forced to move rearwardly along the load bed 74. It will be understood by those skilled in the art, that while the rolling rack 84 is spring biased to move toward the forward end of the load bed 74, the bias of the spring means is overcome with the delivery of each successive bale tier from the second table 26 to the front end of the load bed 74 whereby the rolling rack 84 is forced to move rearwardly one bale width until the rack 84 reaches a rearmost position along the load bed 74, whereupon a complete stack has been formed on the load bed 74. The structure and function of the rolling rack 84, well known in the art, is generally similar to that illustrated and described in U.S. Pat. No. 2,848,127 and need not be illustrated and described in detail herein for a thorough and clear understanding of the present invention.

When the load bed 74 has been fully loaded, the stack can be transferred to the ground in the form of a composite stack by extension of the hydraulic cylinders 82 which causes the load bed 74 to pivot generally 90° about point 78 from its generally horizontal position of FIG. 1 to an upright position in which the rolling rack 84 and the rear end of the load bed 74 are disposed adjacent the ground.

BALE RETAINER MEANS

As explained above, the ability of the stack formed on the bale wagon 10 to stand over long periods of time when placed on the ground depends greatly upon the ability of the first table 22 to accurately transfer bales to desired predetermined locations on the second table 26 so as to facilitate the proper positioning of the various bales in the tiers thereof formed on the second table 26 and that eventually become the various horizontal layers of bales in the standing stack. The outer trip arm 52 is provided for assisting the first table 22 in accurately transferring two bales to the second table 26, while the inner trip arm 54 is utilized for the transfer of a single bale.

However, it has been pointed out hereinbefore that under certain adverse crop and terrain conditions dislocation of the bales along the first table 22 toward its bale receiving end sometimes occurs after the table is tripped and begins its pivotal movement toward the forward end of the second table 26.

Viewing FIGS. 2 through 5, it will be observed that bale retainer means, being indicated generaly as 86 and constituting the improvement of the present invention, is provided for engaging the single bale or the trailing or second one of two bales so as to restrain or prevent its movement along the first table toward the bale-receiving end thereof. In such manner, the bale retainer means 86 together with the respective one of the first table trip arms substantially maintain the bales during their transfer to the second table 26 at the desired positions along the first table 22 which were reached by the bales at the time the same engaged the respective trip arm. Maintenance of the bales at such positions along the first table 22 as the first table 22 pivots upwardly and rearwardly toward the second table 26 facilitates accurate transfer of bales to desired predetermined locations along the front end of the area 24 of the second table 26 which are aligned with such positions of the bales on the first table 22 even under the aforementioned adverse crop and terrain conditions.

In its preferred form the bale retainer means 86 basically comprises a finger-like structure 88, a sleeve structure 90 which mounts the finger structure 88 on the underside of the transverse support member 72 for generally horizontal pivotal movement as well as generally vertical pivotal movement and a spring 92 which biases the structure 88 such that its tip end normally extends toward the right end of the first table 22 and into the path of movement of bales therealong.

The finger structure 88 includes a finger portion, generally designated 94, which extends generally perpendicularly from a base portion 96 which, in turn, is fixed to one end of a mounting shaft 98. The finger portion 94 formed by an elongated, flat and relatively narrow strip of metal has an inner part 100 and an outer part 102 which is coplanar with and merges from the inner part 100. However, the longitudinally-extending opposite parallel edges of outer part 102 depart respectively from the longitudinally-extending opposite parallel edges of the inner part 100 at an angle of approximately 25° with respect thereto. As the opposite edges of the outer part 102 near the terminus of the finger portion 94, they converge to form a point or tip 104 on the structure 88. Also, the structure 88 includes a brace portion 106 formed by a triangular-shaped flat strip of metal which is fixed in perpendicular relationship to both the finger and base portions 94,96. The brace portion 106 extends parallel to the longitudinal extent of the inner part 100 and terminates on the outer part 102 just short of where the opposite edges thereof begin to converge.

Figure 5:
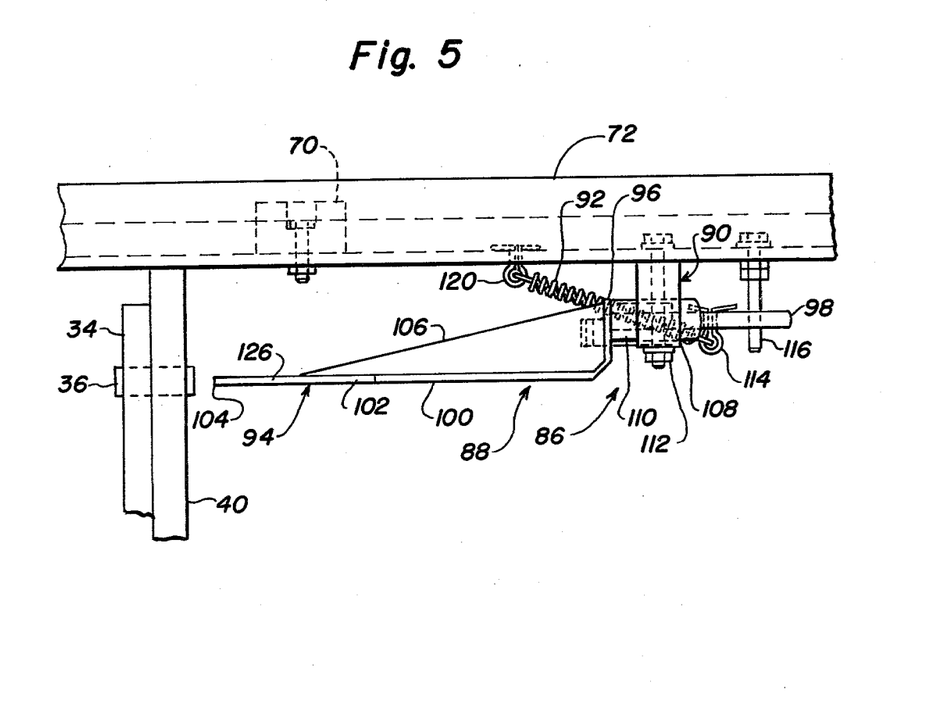
FIG. 5 is a front elevational view taken along line 5—5 in FIG. 4.

The sleeve structure 90 which mounts the finger structure 88 includes first and second sleeve elements 108,110 secured together in side-by-side orthogonal relationship. The sleeve structure 90 is rotatably mounted to the underside of the transverse support member 72 in vertically depending relationship thereto by a nut and bolt assembly 112 received through the first sleeve element 108 and fastened to the member 72. The assembly 112 defines the generally vertical rotational axis of the sleeve element 108. Since the first sleeve element 108 is disposed in a generally vertical position, the second sleeve element 110 fixed thereto is disposed on a generally horizontal position, as seen in FIG. 5. The mounting shaft 98 of the finger structure 88 is received through the second sleeve element 110 and thereby is rotatably mounted about the horizontal axis defined by element 110. Consequently, the finger structure 88 is rotatable or pivotal about two orthogonally-aligned axes, the vertical axis defined by nut and bolt assembly 112 and the horizontal axis defined by second sleeve element 110.

Figure 4:
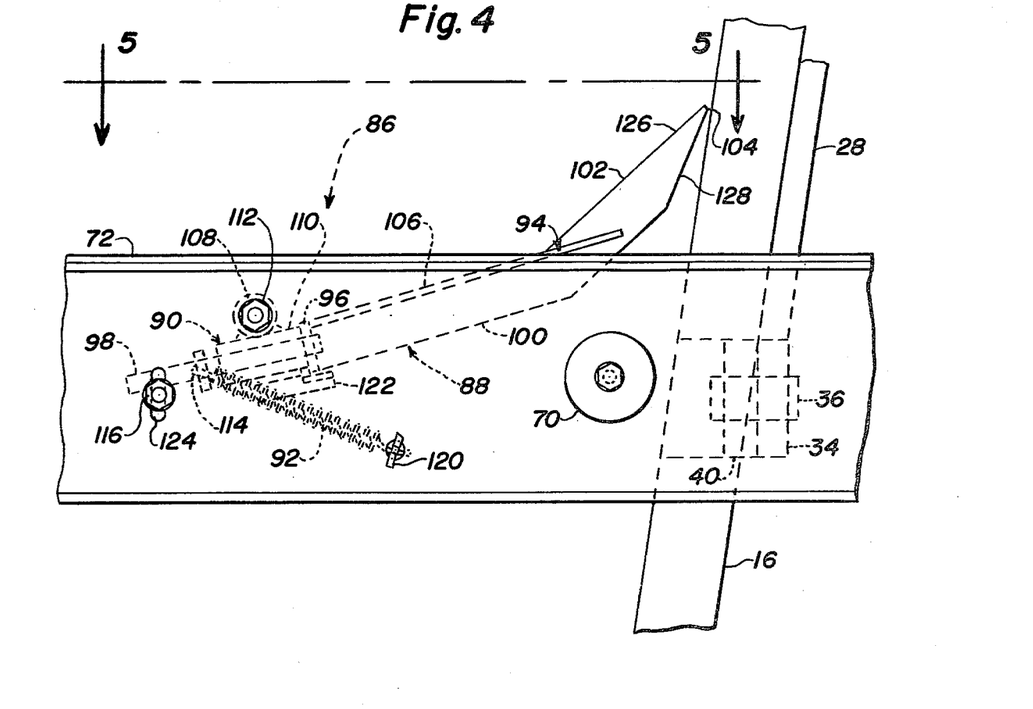
FIG. 4 is an enlarged fragmentary top plan view of the bale retainer means and the immediate surrounding portions of the front end of the bale wagon of FIG. 2.

The spring 92 biases the finger structure 88 toward the position of the latter shown in FIG. 4. A cotter pin 114 is fastened to the mounting shaft 98 of finger structure 88 adjacent the end of the second sleeve element 110 opposite to the other end which is next to the base portion 96 of the structure 88. A second nut and bolt assembly 116 is fastened to and depends from the transverse support member 72 adjacent to and across the rotational or pivotal path of the free end 118 of the mounting shaft 98 of the structure 88. The assembly 116, therefore, serves as a stop against which the free end 118 of the mounting shaft 98 abuts due to the counterclockwise rotational biasing force, as viewed in FIG. 4, imposed by the spring 92 on the structure 88 about the vertical axis defined by the bolt assembly 112. The spring 92 is connected at one end to the head of pin 114 and extends toward the right to its opposite end which is connected by a cotter pin 120 to the support member 72 at a location rearwardly of the vertical rotational axis defined by the first sleeve element 108 as well as the horizontal rotational axis defined by the second sleeve element 110. Furthermore, generally horizontal tab 122 is fixed to the rear side of the second sleeve element 110 and extends to the right thereof across the rotational or pivotal path of the base portion 96 of the finger structure 88. The tab 122, therefore, serves as a stop against which the base portion 96 abuts due to the clockwise rotational biasing force, as viewed from right side of the bale wagon on FIG. 4, imposed by the spring 92 on the finger structure 88.

The nut and bolt assembly 116 extends through a slot 124 formed in the support member 72 whereby the position of the assembly 116 may be adjusted along the slot 124. The position of the assembly 116 along the slot 124 is selected such that the finger structure 88 will normally be disposed as illustrated in FIGS. 4 and 5. In such disposition, which may be termed the lower, bale engaging position of the structure 88, it is seen that the outer part 102 of the finger portion 94 extends to above the first table rear beam 32 and into the path of a bale being advanced along the first table 22 from its left bale-receiving end toward its right end.

Figure 2:
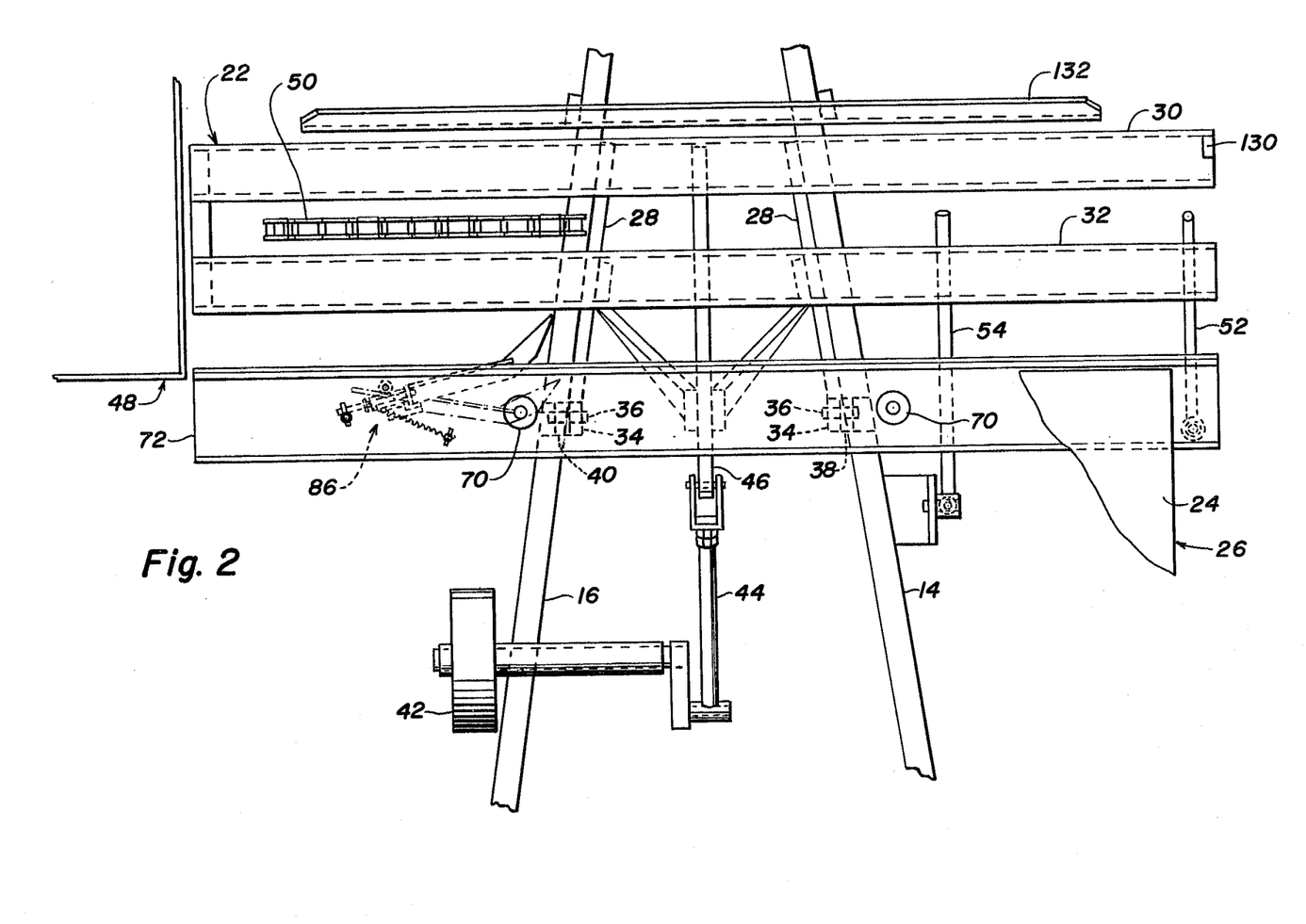
FIG. 2 is an enlarged fragmentary top plan view of the forward end of the bale wagon of FIG. 1, showing the bale retainer means pivotally mounted below the front end of the second table for generally horizontal movement between the solid and broken line positions and biased so as to normally be disposed at its solid line position in which it extends forwardly and toward the right into the path of bales advanced along the first table toward the right end thereof.

However, the outer part 102 of the finger portion 94 also extends diagonally into the bale path toward the right end of the first table 22, whereby the front one 126 of the opposite converging edges of the outer part 102 will act as a cam surface on the finger structure 88 such that when it is initially engaged by the leading end of the advancing bale, the structure 88 will progressively be urged in a clockwise direction about its vertical axis, as viewed in FIG. 4, against the counterclockwise biasing force of spring 92 until the structure 88 reaches a fully retracted position below the support member 72, as seen in broken line form in FIG. 2. The structure 88 reaches such retracted position when the leading end of the bale passes the tip or point 104 on the structure 88.

Once the bale passes such point, any attempt at movement of the bale in a reverse direction will immediately cause the tip 104 of the counterclockwise biased structure 88 to bite or become embedded into the bale such that the rear one 128 of the opposite converging edges of the outer part 102 will form an abutment or stop surface that will resist or prevent such reverse movement of the bale. And, it will be understood that such embedding of the tip of finger structure 88 into the bale may occur as the first table is pivoting upwardly in delivering the bale or bales to the second table 26.

It should be pointed out here that the nut and bolt assembly 112 mounts the sleeve structure 90 and thereby the finger structure 88 at such a location along the support member 72 where the tip 104 of the structure 88 will engage either the second or trailing one of two bales received along the first table 22 or a single bale received in a centered position along the first table 22. Thus, the retainer means 86 is effective for its intended purpose regardless of whether the outer trip arm 52 or the inner trip arm 54 is to be the one which will actuate the first table 22 at any given time.

Figure 6:
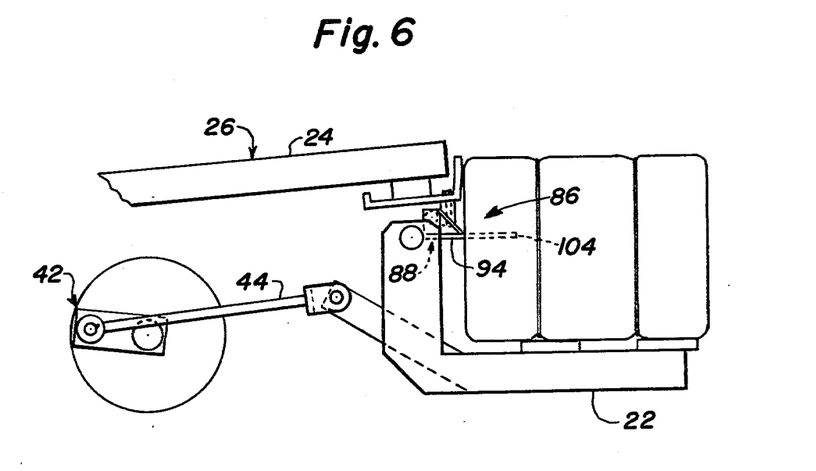
FIGS. 6 through 8 are diagrammatic representations of the first table having received a bale and being pivotally moved from its lower, bale-receiving position toward its upper, bale-discharge position, and also of the bale retainer means concurrently pivoting from its lower position to its upper bale-receiving position due to its engagement with the bale on the pivoting first table.
Figure 7:
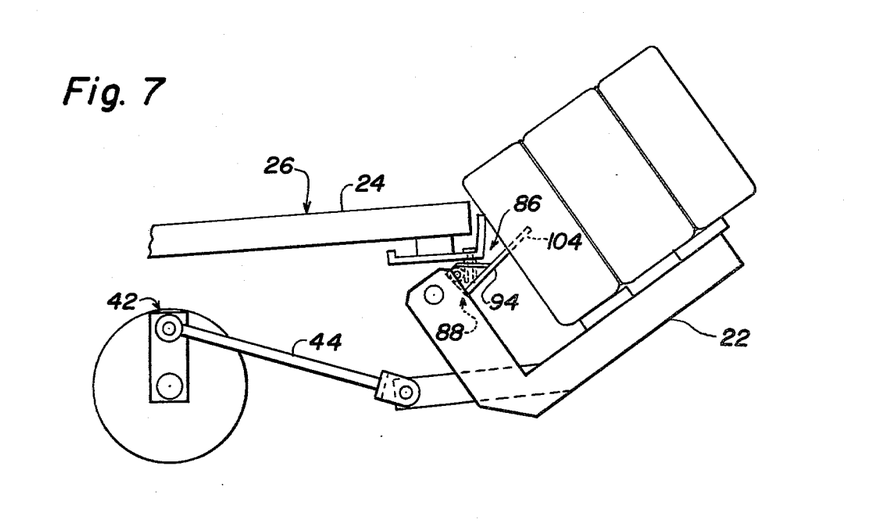
Figure 8:
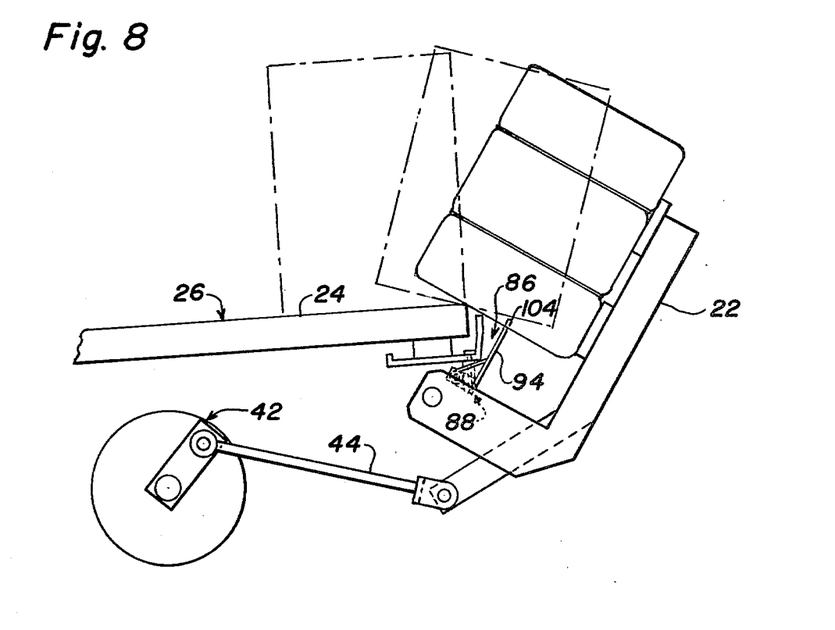

Referring now to FIGS. 6 through 8, the finger structure 88 is seen pivoting about the horizontal axis defined by the second sleeve element 110 as the bale in which the tip 104 of the structure 88 is embedded is being moved to the second table 26. It will be noted that the tip 104 of the finger portion 94 will be moved along an arcuate path having a substantially shorter radius than the radius of the arcuate path of movement of that portion of the bale with which the tip 104 is engaged or in which it is embedded. Consequently, although the tip 104 of the finger portion 94 remains embedded in the bale such that the latter is restrained from moving toward the bale-receiving end of the first table 22, the bale progressively moves away from the tip 104 as the bale is moved upwardly along its arcuate path toward the second table 22 and the finger structure is moved upwardly along its arcuate path from its lower, bale-engaging position. The geometry of the respective arcuate paths are such that the finger structure tip 104 remains embedded in the bale until the latter has been placed into firm contact with the front end of the second table 26. However, the geometry is also such that the finger structure 88 reaches an upper, bale-releasing position, as seen in FIG. 8, where the pivotal movement of the finger structure 88 terminates and its finger portion tip 104 withdraws completely from the bale before the bale is completely placed onto the second table 26. It will be understood, therefore, that because of such arrangement of the finger structure 88 relative to the first table 22, its tip 104 does not have to be forced out the bale once the bale reaches the second table 26. Instead, the withdraw of the tip 104 from the bale is gradual and smooth, and completed prior to the first table 22 reaching its upper position. Therefore, the upward and rearward transfer of the bale will not be impeded by the bale retainer means 86; on the contrary, the accuracy of such transfer will be enhanced and preserved.

It has been mentioned hereinabove that the bale retainer means 86 together with the respective one of the first table trip arms substantially maintain the bales during their transfer to the second table 26 at the desired positions along the first table 22 which were reached by the bales at the time the same engaged the respective trip arm. It will be noticed, however, that soon after the first table 22 has begun to pivot upwardly, it will pass the upper end of the respective trip arm. Once it has passed the top of the trip arm, the right end of the first table 22 is open. Consequently, an upright stop 130, shown in FIGS. 1 through 3 and being fixed to the right end of the front beam 30, will eliminate any tendency for movement and thereby dislocation of the leading one of two bales on the first table 22 further toward the right of the bale wagon 10 as the first table 22 continues its delivery of the bales to the second table 26.

It should also be mentioned that a vertical plate member 132 is mounted transversely across the chassis 12 adjacent and forwardly of the front table 22. Its rearwardly-facing side serves as a front bale guide for the bales received and advanced along the first table 22.

It is thought that the bale retainer means of the present invention and many of its attendant advantages will be understood from the foregoing description and it will be apparent that various changes may be made in its location on the bale wagon and in the form, construction and arrangement of its parts within departing from the spirit and scope of the invention or sacrificing all of its material advantages, the form hereinbefore described being merely a preferred or exemplary embodiment thereof.

Having thus described the invention, what is claimed is:

1. In a bale wagon having means defining a bale-supporting area, means disposed adjacently along said bale-supporting area for receiving at least one bale, means for advancing said bale along said bale-receiving means from a bale-receiving end thereof to a position therealong aligned with a predetermined location on said bale-supporting area and means for moving said bale from said bale-receiving means to said bale-supporting area, the improvement which comprises:

bale retainer means arranged near said bale-receiving means for engaging said bale so as to substantially restrain said bale from moving toward said bale-receiving end of said bale-receiving means out of alignment with said predetermined location on said bale-supporting area during movement of said bale toward said bale-supporting area, said bale retainer means including a finger element being biased toward a bale-engaging position wherein it extends into the path of advancement of said bale along said bale-receiving means so as to prevent said bale from being moved toward said bale-receiving end of said bale-receiving means, said finger element also being yieldable toward another position away from said path of bale advancement for allowing movement of said bale along said path toward said position along said bale-receiving means aligned with said location on said bale-supporting area.

2. In a bale wagon having means defining a bale-supporting area, means disposed adjacently along said bale-supporting area for receiving at least one bale, means for advancing said bale along said bale-receiving means from a bale-receiving end thereof to a position therealong aligned with a predetermined location on said bale-supporting area and means for moving said bale from said bale-receiving means to said bale-supporting area, the improvement which comprises:

bale retainer means arranged near said bale-receiving means for engaging said bale so as to substantially restrain said bale from moving toward said bale-receiving end of said bale-receiving means out of alignment with said predetermined location on said bale-supporting area during movement of said bale toward said bale-supporting area, said bale retainer means including a finger element being yieldably biased toward a bale-engaging position for restraining said bale and movable between said bale restraining position and a bale releasing position by said movement of said bale toward said bale-supporting area, said finger element reaching its bale-releasing position as said bale reaches said bale-supporting area.

3. In a bale wagon having a first table for receiving at least one bale, means for advancing said bale along said first table from a bale-receiving end thereof, means disposed along said first table for accumulating bales into a tier thereof, transferring means for moving said bale from said first table to said bale-accumulating means and means located along said first table remote from said bale-receiving end thereof for actuating said transferring means upon sensing that said advancing bale has reached a position along said first table aligned with a predetermined location on said bale-accumulating means, the improvement which comprises:

means generally located between said bale-sensing means and said bale-receiving end of said first table for engaging said bale so as to substantially prevent said bale from being dislocated toward said bale-receiving end of said first table out of alignment with said predetermined location on said bale-accumulating means during movement of said bale toward said bale-accumulating means, said bale engaging means including a finger-like structure movably mounted along said first table and normally yieldably biased so as to extend diagonally into the path of advancement of said bale and generally away from said bale-receiving end of said first table, said structure having a cam surface facing generally toward said bale-receiving end of said first table and a bale retaining surface generally facing toward an opposite end of said first table, said mounting and biased arrangement of said structure being such that engagement of said advancing bale with said cam surface will yieldably move said structure out of said bale advancement path and thereby allow said bale to continue its advancement toward said position along said first table, while engagement of said bale with said retaining surface will prevent movement of said bale on said first table away from said position therealong.

4. In a bale wagon having a first table for receiving at least one bale, a second table having a bale-supporting area disposed above and adjacent said first table, means for loading a bale on said first table at a bale-receiving end thereof and disposing said bale at a position along said first table aligned with a predetermined location on said bale-supporting area of said second table and means for moving said bale upwardly to transfer said bale from said first table to said bale-supporting area of said second table, the improvement which comprises:

bale retainer means generally located between said first and second tables and engaging said bale so as to substantially restrain said bale from being dislocated toward said bale-receiving end of said first table out of alignment with said predetermined location on said bale-supporting area of said second table during transfer of said bale to said bale-supporting area of said second table.

5. A bale wagon as recited in claim 4, wherein said bale retainer means is mounted for movement and moves concurrently with said bale from a lower, bale restraining position toward an upper, bale releasing position as said bale is moved upwardly to said bale-supporting area of said second table.

6. A bale wagon as recited in claim 4, wherein the geometry of the path of movement of said bale retainer means relative to the path of movement of said bale toward said second table is such that said bale gradually moves away from said bale retainer means as said bale approaches said second table, whereby said bale retainer means is gradually withdrawn from said bale as it approaches its bale releasing position.

* * * * *